(12) United States Patent
Martinez et al.

(10) Patent No.: US 7,932,815 B2
(45) Date of Patent: Apr. 26, 2011

(54) WIRELESS TRACTOR-TRAILER COMMUNICATIONS

(75) Inventors: Rene Martinez, Seattle, WA (US); Arvin Danielson, Solon, IA (US)

(73) Assignee: Intermec IP Corp., Everett, WA (US)

( * ) Notice: Subject to any disclaimer, the term of this patent is extended or adjusted under 35 U.S.C. 154(b) by 930 days.

(21) Appl. No.: 11/835,730

(22) Filed: Aug. 8, 2007

(65) Prior Publication Data
US 2008/0227411 A1   Sep. 18, 2008

Related U.S. Application Data

(60) Provisional application No. 60/895,225, filed on Mar. 16, 2007.

(51) Int. Cl.
  *G08B 21/00*   (2006.01)
(52) U.S. Cl. ............... 340/431; 340/539.23; 340/686.6; 340/933; 455/41.2
(58) Field of Classification Search .............. 340/431, 340/933, 539.23, 686.6, 539.11–539.32, 340/8.1, 573.1, 573.3, 573.4, 573.6; 246/6, 246/122 R, 123, 167 R; 455/41.2, 456.1, 455/456.3; 701/19; 342/27, 28
See application file for complete search history.

(56) References Cited

U.S. PATENT DOCUMENTS

| | | | | |
|---|---|---|---|---|
| 4,026,654 A | * | 5/1977 | Beaurain | 356/5.07 |
| 5,377,938 A | * | 1/1995 | Bezos et al. | 246/167 R |
| 5,720,455 A | * | 2/1998 | Kull et al. | 246/187 C |
| 6,002,336 A | * | 12/1999 | Widding et al. | 340/573.1 |
| 6,286,104 B1 | * | 9/2001 | Buhle et al. | 726/4 |
| 7,031,946 B1 | * | 4/2006 | Tamai et al. | 705/67 |
| 7,130,582 B2 | * | 10/2006 | Barilovits | 455/41.2 |
| 7,187,278 B2 | * | 3/2007 | Biffar | 340/539.13 |
| 7,248,933 B2 | * | 7/2007 | Wildman | 700/90 |
| 7,639,135 B2 | * | 12/2009 | Arms et al. | 340/572.1 |
| 7,643,833 B2 | * | 1/2010 | Sankisa | 455/456.1 |

\* cited by examiner

*Primary Examiner* — George A Bugg
*Assistant Examiner* — Anne V Lai
(74) *Attorney, Agent, or Firm* — Shook, Hardy & Bacon, L.L.P.

(57) ABSTRACT

Computer-readable media, systems, and methods for wirelessly communicating between a tractor and a set of trailers in a tractor-trailer environment are described. In embodiments, a tractor wireless communication device associated with a tractor is initialized and associated with a tractor initialization time. Additionally, a trailer wireless communication device associated with at least one trailer is initialized and associated with a trailer initialization time. In various embodiments, it is determined whether the tractor wireless communication device and the trailer wireless communication device are in physical proximity by comparing initialization times. Further, in various embodiments, tractor-trailer information events are communicated wirelessly between a tractor and a trailer.

27 Claims, 8 Drawing Sheets

WIRELESS TRACTOR-TRAILER COMMUNICATIONS

CROSS-REFERENCE TO RELATED APPLICATIONS

This application claims the benefit of U.S. Provisional Application 60/895,225 filed Mar. 16, 2007.

STATEMENT REGARDING FEDERALLY SPONSORED RESEARCH OR DEVELOPMENT

Not applicable.

BACKGROUND

Millions of dollars worth of goods are transported each day using traditional tractor-trailer truck configurations. Products, mail, produce, and various other cargo items make their way from distribution center hubs to various spoke locations across the country and throughout the world. Vast amounts of resources are exhausted in an effort to make the process as efficient as possible and to most effectively track the progress of cargo. Complex computer programs and processes maintain information about the cargo whereabouts as well as distribution patterns.

Presently, however, there is no effective way for a tractor to communicate with a trailer it is hauling. The communication systems that do exist use traditional wire coupling between the tractor and the trailer for information transfer. This communication configuration is less than desirable for a number of reasons, not the least of which is that the wire coupling was originally designed for simple functionality. Specifically, the wire coupling was designed for functions such as transmitting power to the tail lights and providing signals to the brake lights and blinkers on the trailer. The wire coupling was not designed for complex data transfer in a tractor-trailer system. Because the wire coupling was not intended for complex data transfer, the wires are not adequately protected and occurrences of interference are typical, obscuring the communication in the tractor-trailer environment. Efficiency and performance of tractor-trailer distribution schemes are hindered by the lack of available communication. For instance, where a tractor mistakenly hitches the wrong trailer, there is no effective way to communicate the mistake to the driver and, thus, the wrong cargo is transported, wasting time and fuel and perhaps compromising the quality of the cargo.

SUMMARY

Embodiments of the present invention provide computer-readable media, systems, and methods for trailer-tractor wireless communication. In various embodiments, a tractor wireless communication device and at least one trailer wireless communication device are initialized and associated with a tractor initialization time and a trailer initialization time, respectively. Further, in various embodiments, it is determined whether the tractor wireless communication device and the trailer communication device(s) are in physical proximity based upon a comparison of the tractor initialization time and the trailer initialization time. In various other embodiments, a tractor-trailer environment is monitored for one or more tractor-trailer information events and, upon receiving a trailer event, tractor-trailer information is processed in accordance with the tractor-trailer information event. Further, in various embodiments, the processed tractor-trailer information is presented.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
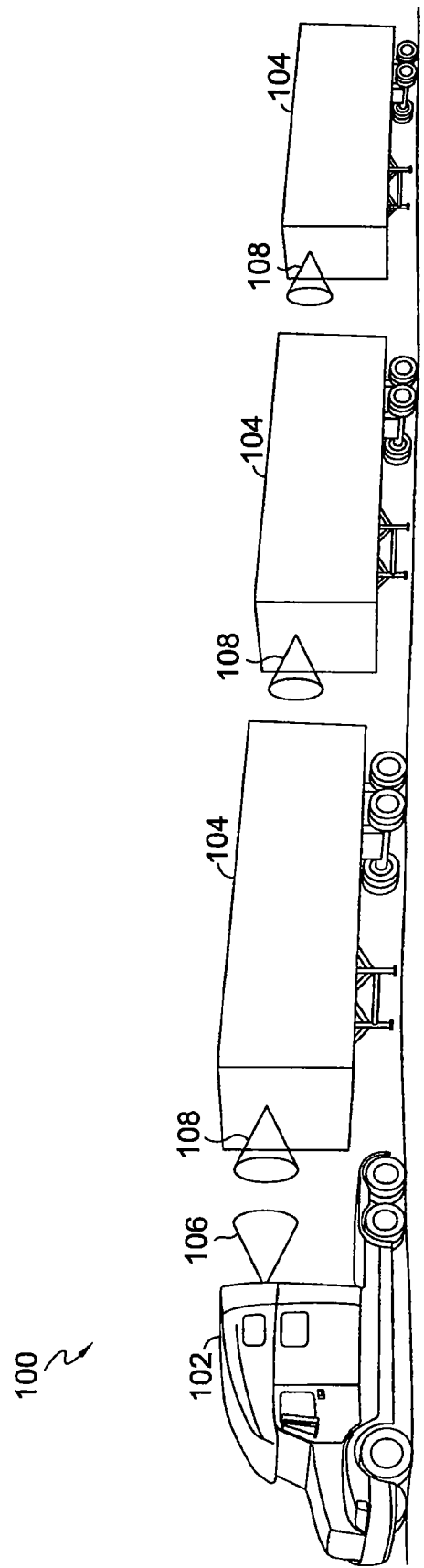
FIG. 1 is a depiction of an exemplary tractor-trailer environment suitable for wireless tractor-trailer communication.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide computer-readable media, systems, and methods for trailer-tractor wireless communication. In various embodiments, a tractor wireless communication device and at least one trailer wireless communication device are initialized and associated with a tractor initialization time and a trailer initialization time, respectively. Further, in various embodiments, it is determined whether the tractor wireless communication device and the trailer communication device(s) are in physical proximity based upon a comparison of the tractor initialization time and the trailer initialization time. In various other embodiments, a tractor-trailer environment is monitored for one or more tractor-trailer information events and, upon receiving a trailer event, tractor-trailer information is processed in accordance with the tractor-trailer information event. Further, in various embodiments, the processed tractor-trailer information is presented. While embodiments discussed herein refer to wireless communications generally, it will be understood by one of ordinary skill in the art that embodiments are not limited to a particular wireless communications protocol.

Accordingly, in one aspect, the present invention is directed to a method in a tractor-trailer environment for wirelessly communicating between a tractor and a set of trailers. The method includes initializing a tractor wireless communication device associated with the tractor and at least one trailer wireless communication device associated with at least one of the set of trailers. The method further includes associating the tractor wireless communication device and the at least one trailer wireless communication device with a tractor initialization time and a trailer initialization time, respectively. Further, the method includes determining whether the tractor wireless communication device and the at least one trailer wireless communication device are in physical proximity by comparing the tractor initialization time with the at least one trailer initialization time.

In another aspect, the present invention is directed to a tractor-trailer communications system for providing wireless communication between a tractor and a set of trailers. The system includes a tractor wireless communication device associated with the tractor, at least one trailer wireless communication device associated with at least one of the set of trailers, an initialization comparing component configured to determine if the tractor wireless communication device and the at least one trailer wireless communication device are in physical proximity using initialization information, a monitoring component configured to monitor a tractor-trailer environment for a back-channel event, and a back-channel comparing component configured to determine if the tractor wireless communication device and the at least one trailer communication device are in physical proximity using back-channel event information. The system further includes a database for storing information associated with the wireless communication devices.

In another embodiment, the present invention is directed to one or more computer readable media having instructions embodied thereon that, when executed, perform a method for wirelessly communicating between a tractor and a set of trailers. The computer readable media includes monitoring a tractor-trailer environment for one or more trailer events. The computer readable media further includes, upon receiving the one or more tractor-trailer information events, processing tractor-trailer information in accordance with the one or more tractor-trailer information events. Further, the computer readable media includes presenting the processed tractor-trailer information.

In yet another embodiment, the present invention is directed to a method for wirelessly communicating. The method includes initializing a first wireless communication device and initializing a second wireless communication device. The method further includes establishing a communications link between the first wireless communication device and the second wireless communication device. Further, the method includes monitoring a communications environment for an information event and upon receiving the information event, determining whether the first wireless communication device and the second wireless communication device are in physical proximity based upon the information event.

Having briefly described an overview of embodiments of the present invention, an exemplary operating environment is described below.

In describing various exemplary embodiments, several acronyms and shorthand notations are used to aid the understanding of certain concepts pertaining to the associated system and services. These acronyms and shorthand notations are solely intended for the purpose of providing an easy methodology of communicating ideas expressed herein and are in no way meant to limit the scope of the present invention. The following is a list of these acronyms:

| | |
|---|---|
| 1xRTT | Single Carrier Radio Transmission Technology |
| 3G | Third generation wireless network |
| 4G | Fourth generation wireless network |
| BLUETOOTH | Technology for connecting devices using a short-ranged wireless connection. (802.15.1 network) |
| CDMA | Code Division Multiple Access |
| EDGE | Enhance Data Rates for GSM (and TDMA) Evolution |
| EV-DO | Evolution Data Only or Evolution Data Optimized |
| GPRS | General Packet Radio Services |
| ZIGBEE ® | IEEE 802.15.4 |

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited references.

Referring to the drawing figures in general, and initially to FIG. 1 in particular, an exemplary tractor-trailer environment suitable for wireless tractor-trailer communications is shown and designated generally as tractor-trailer environment 100. Tractor-trailer environment 100 is but one example of a suitable tractor-trailer environment and is not intended to suggest any limitation as to the scope of use or functionality of the invention. Neither should the tractor-trailer environment 100 be interpreted as having any dependency or requirement relating to any one or combination of components illustrated. For example, without limitation, the tractor-trailer environment could include a non-commercial tractor, such as a standard pick-up truck and the trailer could include various types of trailers, such as a boat or a "fifth wheel" motor home used for camping excursions.

Embodiments of the present invention may be described in the general context of wireless communication. Wireless communication may include various protocols and other wireless technology. Examples of wireless technologies may include 3G and 4G wireless technologies and the IEEE series of wireless technologies. More particularly, wireless communication may take place over a CDMA, EDGE, EV-DO, GPRS, GSM, UMTS, W-CDMA, or 1xRTT network as well as an IEEE 802.11 (WiFi), 802.15 (Bluetooth and Zigbee), 802.16 (WiMAX), or 802.20 (MBWA) network. The list of wireless technologies is not limited to the technologies here and may include other UWB radio signals.

Embodiments of the present invention may also be described in the general context of computer code or machine-useable instructions, including computer-executable instructions such as program modules, being executed by a computer or other machine, such as a personal data assistant or other handheld device. For example, without limitation, the computer or other machine might be located in the tractor, relaying information to the driver of the tractor. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. For instance, without limitation, the computer may react to input from a tractor driver. As another example, without limitation, the computer may react to input from a remote location, such as a parcel service office. The instructions cooperate with other code segments to initiate a variety of tasks in response to data received in conjunction with the source of the received data.

Tractor-trailer environment 100 includes a tractor 102 that couples with at least one trailer 104, a tractor wireless communication device represented by 106, and at least one trailer wireless communication device represented by 108. The configuration of tractor 102 and trailer 104 includes various tractor-trailer configurations. For example, without limitation, and as depicted in FIG. 1, tractor 102 may be coupled, either directly or indirectly, more than one trailer 104. In various other embodiments, tractor 102 may be coupled to only a single trailer 104. Tractor 102 may include any type of machine designed for pulling. For example, and without limitation, tractor 102 may include a long-haul semi truck tractor, a non-commercial pickup truck, a tow-truck, tug-boat, and various other types of pulling machinery. Trailer 104 may include a long-haul semi truck trailer, a non-commercial enclosed trailer (e.g. a horse trailer), a non-commercial exposed trailer (e.g. a motorcycle trailer), a boat trailer, a camping trailer, a boat for coupling with a tug-boat, and various other types of loads for coupling with pulling machinery.

Tractor wireless communication device 106 and trailer wireless communication device 108, in various embodiments, include various configurations. For example, without limitation, tractor wireless communication device 106 and trailer wireless communication device 108 may include various components associated with computing devices. In this example, tractor wireless communication device 106 and trailer wireless communication device 108 may include a bus that directly or indirectly couples the following elements: memory, one or more processors, one or more presentation components, input/output (I/O) ports, I/O components, and a connection to a power supply (e.g., a connection to the tractor's power supply). Further, in various embodiments, the tractor wireless communication device 106 and trailer wireless communication device 108 may include an internal power supply, such as a battery. In another example, without limitation, tractor wireless communication device 106 and trailer wireless communication device 108 may only include the components for input/output (I/O), and may forward all information to a central computing device located in the tractor-trailer environment for computational processes.

Thus, it should be noted that the diagram of FIG. 1 is merely illustrative of a tractor-trailer environment that may be used in connection with one or more embodiments of the present invention.

Figure 2:
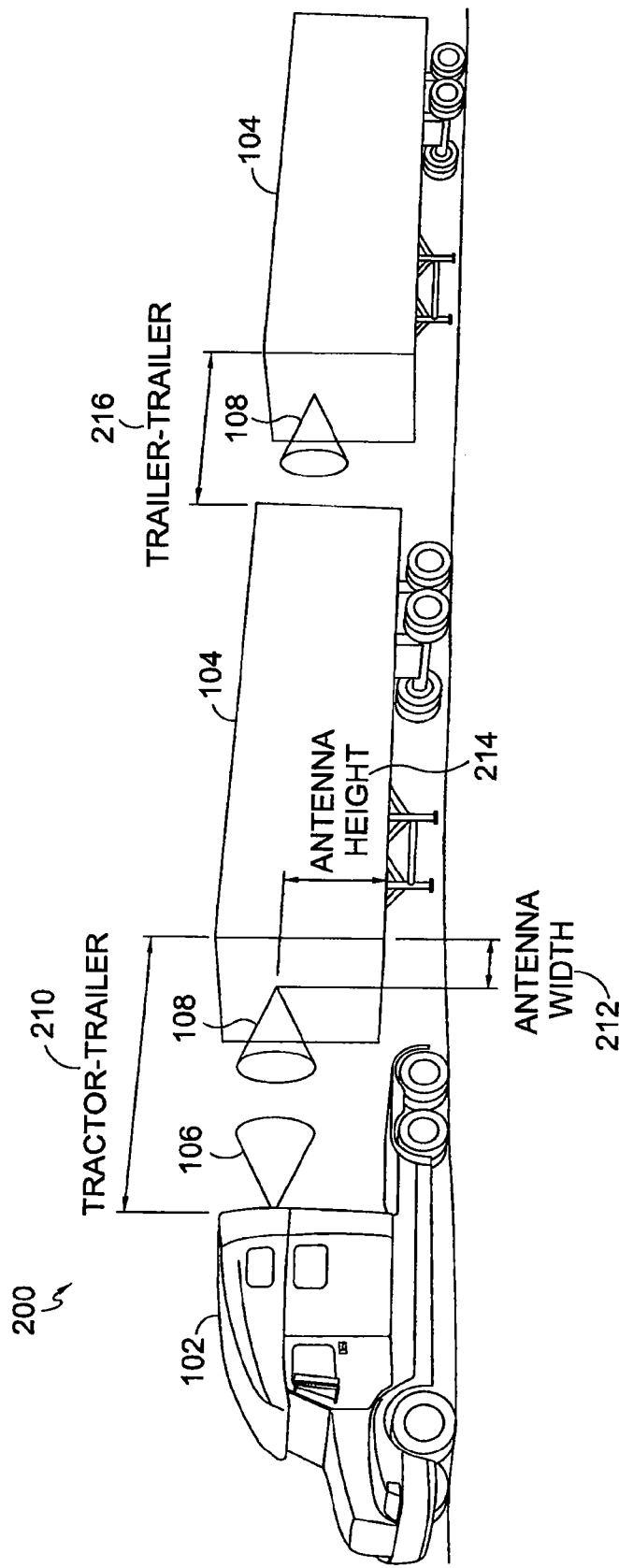
FIG. 2 is another depiction of an exemplary tractor-trailer environment suitable for wireless tractor-trailer communication; the depiction having more detail than the depiction of FIG. 1.
Figure 3:
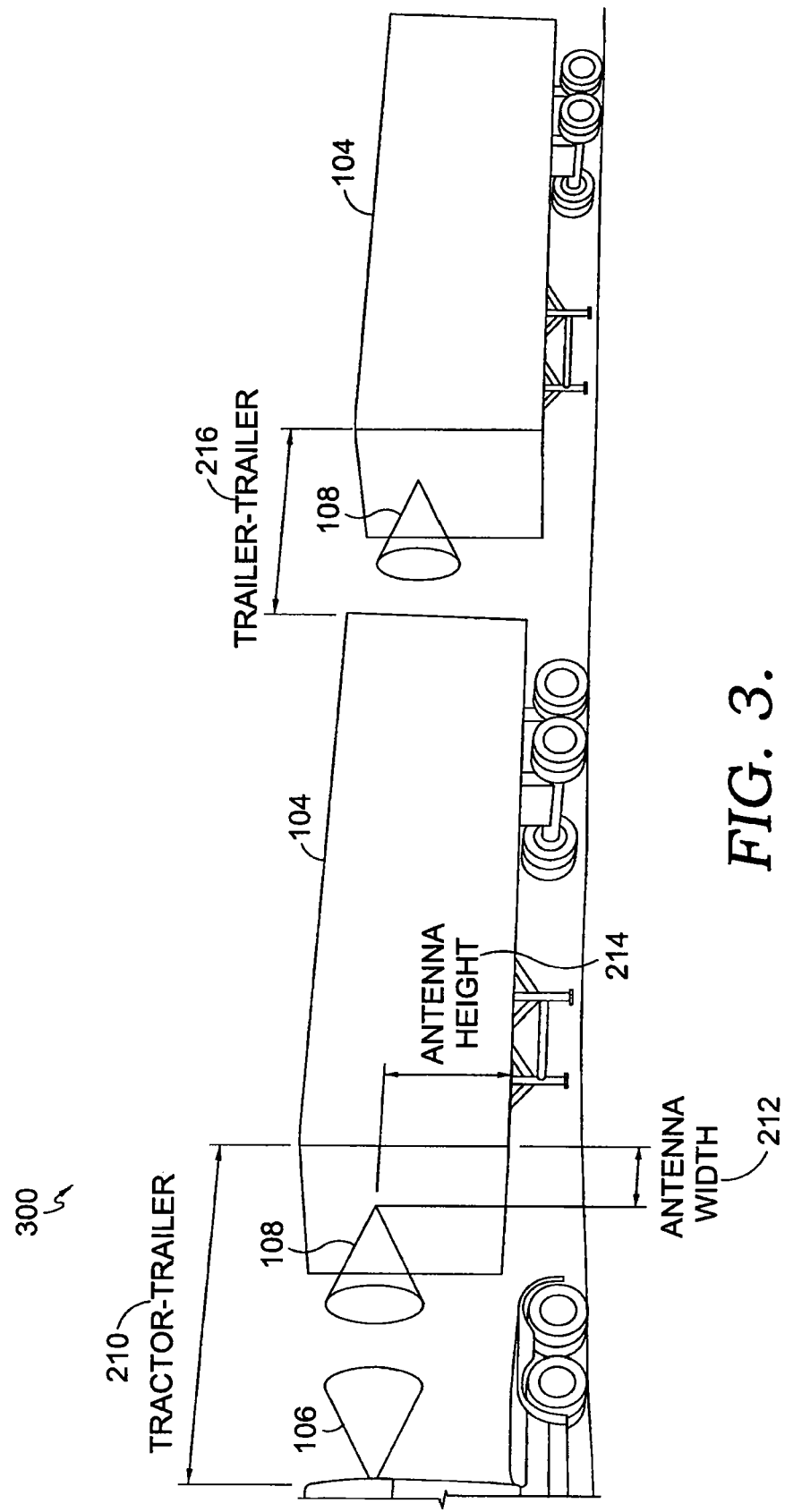
FIG. 3 is another depiction of an exemplary tractor-trailer environment suitable for wireless tractor-trailer communication; the depiction having a closer view than the depiction of FIG. 2.

Turning now to FIGS. 2 and 3, exemplary tractor-trailer environments suitable for wireless tractor-trailer communications, are shown and designated generally as 200 and 300. In tractor-trailer environments 200 and 300, more detail is shown, illustrating exemplary positioning of tractor wireless communication device 106 and trailer wireless communication device 108. Tractor-trailer distance 210, antenna width 212, and antenna height 214 may be various dimensions to ensure effective communication between tractor wireless communication device 106 and trailer wireless communication device 108 in various coupling configurations between tractor 102 and trailer 104. Thus, it should be noted that the diagrams of FIGS. 2 and 3 are provided for illustrative exemplary purposes, and the precise configuration of the elements in a tractor-trailer environment are by no way limited by these depictions.

Tractor wireless communication device 106 and trailer wireless communication device 108 may be configured to communicate various information between the tractor 102 and trailer 104. For example, in various embodiments, tractor wireless communication device 106 and trailer wireless communication device 108 are configured to confirm physical proximity to one another. By way of example, in various embodiments, tractor wireless communication device 106 and trailer wireless communication device 108 confirm physical proximity using initialization times. In this example, both tractor wireless communication device 106 and trailer wireless communication device 108 would be powered down when tractor 102 is not running. Upon ignition of tractor 102, both tractor wireless communication device 106 and trailer wireless communication device 108 would be powered up, or initialized. Upon initialization, both tractor wireless communication device 106 and trailer wireless communication device 108 will be associated with an initialization timer. The timer may function as a counter counting up from the initialization time. In other examples, the timer may keep actual time and note the hour and minute of initialization. In these examples, when a tractor 102 is near a trailer 104, tractor wireless communication device 106 and trailer wireless communication device 108 will recognize each other. Upon recognition, tractor wireless communication device 106 and trailer wireless communication device 108 will compare initialization times and, if the initialization times are very close or identical, tractor wireless communication device 106 and trailer wireless communication device 108 will know tractor 102 is coupled with trailer 104 and a communication link will be established between tractor wireless communication device 106 and trailer wireless communication device 108.

Using the initialization time to confirm physical proximity ensures that a tractor wireless communication device 106 is not in communication with a trailer wireless communication device 108 on a trailer 104 not coupled with tractor 102. Thus, by way of example, without limitation, when a tractor 102 is picking up a trailer 104 from a yard of trailers, tractor wireless device 106 might recognize many trailer wireless communication devices, such as trailer wireless communication device 108. In this example, without a verification technique, tractor wireless device 106 might be unable to determine which wireless communication device is trailer wireless communication device 108 on trailer 104 coupled with tractor 102. Using initialization time as verification, however, ensures tractor wireless device 106 establishes a communication link with the correct trailer communication device, specifically trailer communication device 108.

In other embodiments, tractor wireless communication device 106 and trailer wireless communication device 108 confirm physical proximity using back-channel events. Upon receiving a back-channel event, tractor wireless communication device 106 and trailer wireless communication device 108 confirm physical proximity based upon when the event occurred and/or based upon the nature of the event. By way of example, without limitation, when the tractor driver applies the brakes, tractor wireless communication device 106 is configured to note the time of the brake application from the tractor 102. Similarly, trailer wireless communication device 108 is configured to note the time a brake signal occurs on the trailer 104. If the time of the back-channel event (e.g. brake signal) is similar, or identical, on tractor wireless communication device 106 and trailer wireless communication device 108, physical proximity is confirmed and the communication link is maintained. If, on the other hand, tractor wireless communication device 106 notices a brake signal, but trailer wireless communication device 108 does not notice a brake signal, tractor 102 and trailer 104 are not coupled and tractor wireless communication device 106 and trailer wireless communication device 108 are not in proximity, therefore the communication link is terminated. One of ordinary skill in the art will recognize that the back-channel event may be any type of event that can be observed by a tractor 102 and a trailer 104 when coupled. For instance, without limitation, back-channel events may include blinker events (e.g., traffic signal events), noises, optical observations, or various types of mutually experienced events between a tractor and a trailer.

In embodiments, various information can be communicated between tractor 102 and trailer 104. For example, without limitation, the communicated information may include transportation events such as brake light information, blinker information, brake functionality measurement information, hitch connectivity measurement information, or various other types of information related to transportation of the tractor 102 and trailer 104. Additionally, by way of example, without limitation, the communicated information may include status events such as trailer 104 temperature information in a refrigerated trailer, trailer 104 contents information, trailer 104 weight information, or other types of status information associated with the trailer 104. Further, in various embodiments, the communicated information may include trailer historical information events such as tire wear measurement information, miles on trailer 104, age of trailer 104, or other types of historical information. One of ordinary skill in the art will recognize that, having established wireless communication between tractor 102 and trailer 104, various types of information may be communicated. This discussion provided various embodiments for exemplary purposes but does not limit the present invention to any embodiment recited herein.

In embodiments, information communicated between tractor wireless communication device 106 and trailer wireless communication device 108 may be presented to the tractor driver using various computing devices. Additionally, in various embodiments, information communicated between tractor wireless communication device 106 and trailer wireless communication device 108 may be presented to users at a remote location. Communication between a tractor-trailer device and a remote location are well-known in the art and will not be discussed in further detail herein. Further, one of ordinary skill in the art will recognize that various computing devices will be capable of performing the functionality of the wireless tractor-trailer communication system. Distinction is not made between such categories as "personal computer," "laptop," "hand-held device," etc., as all are contemplated within the scope of FIGS. 2 and 3.

Figure 4:
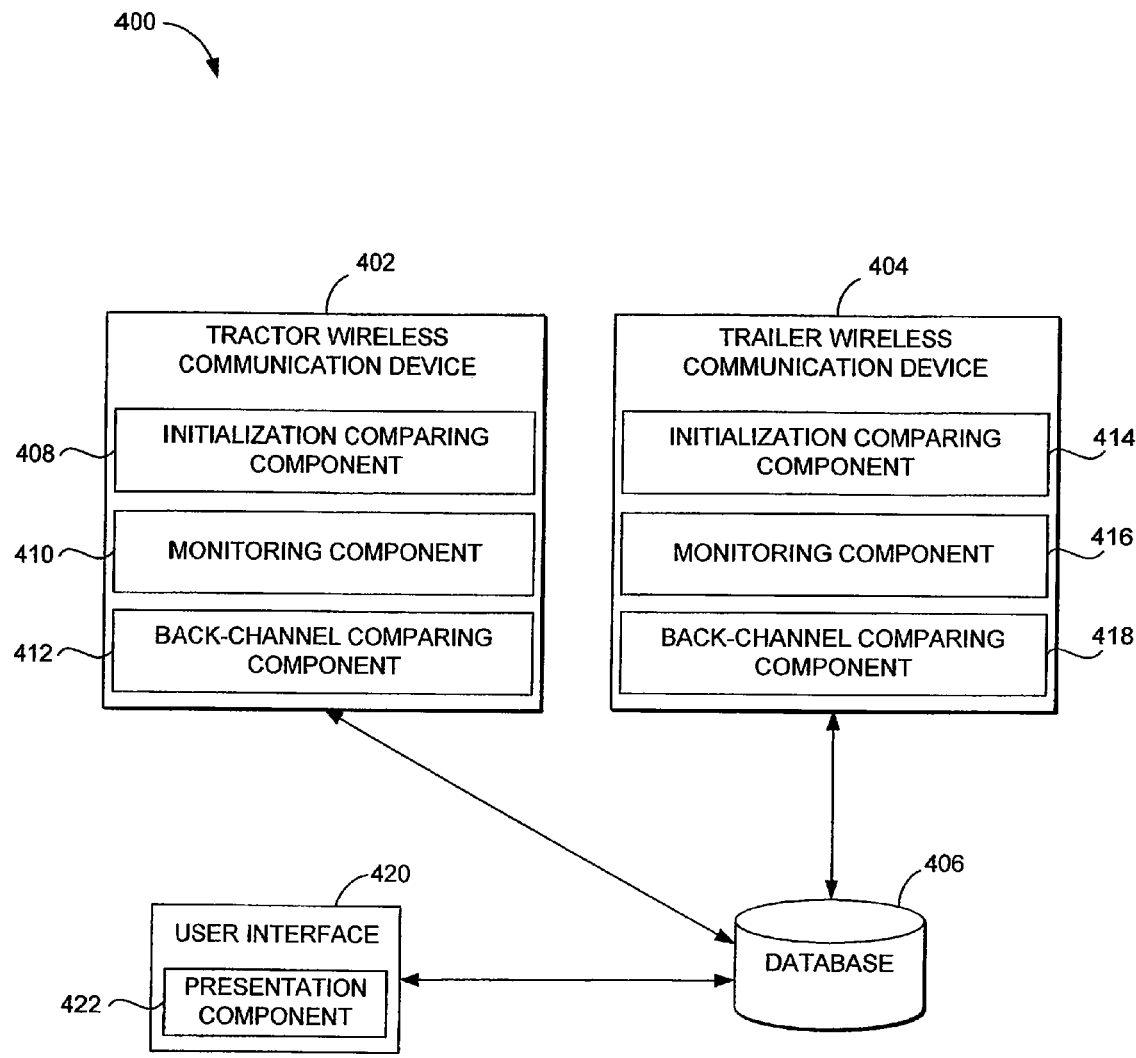
FIG. 4 is a block diagram illustrating an exemplary system for wireless tractor-trailer communication, in accordance with an embodiment of the present invention.

Turning now to FIG. 4, a block diagram is provided illustrating an exemplary system 400 for wireless tractor-trailer communication, in accordance with an embodiment of the present invention. The system 200 includes a tractor wireless communication device 402, a trailer wireless communication device 404, a database 406, and a user device 420, in communication with one another. Tractor wireless communication device 402 is associated with a tractor in a tractor-trailer environment. Similarly, trailer wireless communication device 404 is associated with a trailer in a tractor-trailer environment. Tractor wireless communication device 402 includes various types of wireless communication devices, such as those described with reference to FIGS. 1-3, for example, and includes an initialization component 408, monitoring component 410, and back-channel comparing component 412. Similarly, trailer wireless device 404 includes various types of wireless communication devices, such as those described with reference to FIGS. 1-3, for example, and includes an initialization component 414, monitoring component 416, and back-channel comparing component 418.

Database 406 is configured to store information associated with the tractor-trailer environment. In various embodiments, such information may include, without limitation, initialization information, back-channel information, trailer historical information, trailer status information, and tractor-trailer transportation information, as discussed previously with reference to FIGS. 1-3. It will be understood and appreciated by those of ordinary skill in the art that the information stored in database 406 may be configurable and may include any information relevant to a tractor-trailer environment. The content and/or volume of such information are not intended to limit the scope of embodiments of the present invention in any way. Further, though illustrated as a single, independent component, database 406 may, in fact, be a plurality of databases, for instance, a database cluster, portions of which may reside on a computing device associated with tractor wireless communication device 402, trailer wireless communication device 404, on another external computing device (not shown), or any combination thereof.

Initialization components 408 and 414 are configured to determine if the tractor wireless communication device 402 and the trailer wireless communication 404 are in physical proximity using initialization information. In various embodiments, by way of example, initialization components 408 and 414 may use a counter time starting when power is received (e.g. upon ignition of the tractor) to determine physical proximity. In various other embodiments, initialization components 408 and 414 use hours, minutes, seconds, etc. of a real-time clock to measure initialization time and determine physical proximity.

Monitoring components 410 and 416 are configured to monitor the tractor-trailer environment for back-channel events. In various embodiments, a back-channel event includes a brake indication or a signal indication. In various other embodiments, a back-channel event may include a sound (e.g. a beep when the tractor and trailer are preparing for coupling) or an optical input (e.g. a light on a docking station).

Back-channel comparing components 412 and 418 are configured to determine if the tractor wireless communication device 402 and the trailer wireless communication device 404 are in physical proximity using back-channel event information. For example, without limitation, when a tractor engages brakes, tractor wireless communication device 402 will receive an input indicating a brake event. Similarly, when brakes are engaged on the trailer, trailer wireless communication device 404 will receive an input indicating a brake event on the trailer. If the brake events occur simultaneously or nearly simultaneously, the tractor and trailer are coupled and the tractor wireless communication device 402 and the trailer wireless communication device 404 are in physical proximity.

User device 420 may be a type of computing device, for example, and includes at least one presentation component 422. Presentation component 422 is configured to present (e.g., display) information associated with a tractor wireless communication device, such as tractor wireless communication device 106 of FIG. 1, and information associated with a trailer wireless communication device, such as trailer wireless communication device 108 of FIG. 1. One of ordinary skill in the art will understand and appreciate that presentation component 422 may be configured to present various information associated with a wireless tractor-trailer communication environment. For example, without limitation, presentation component 422 may be configured to present information associated with a back-channel event, a transportation event, a status event, and a trailer historical information event, among others.

Figure 5:
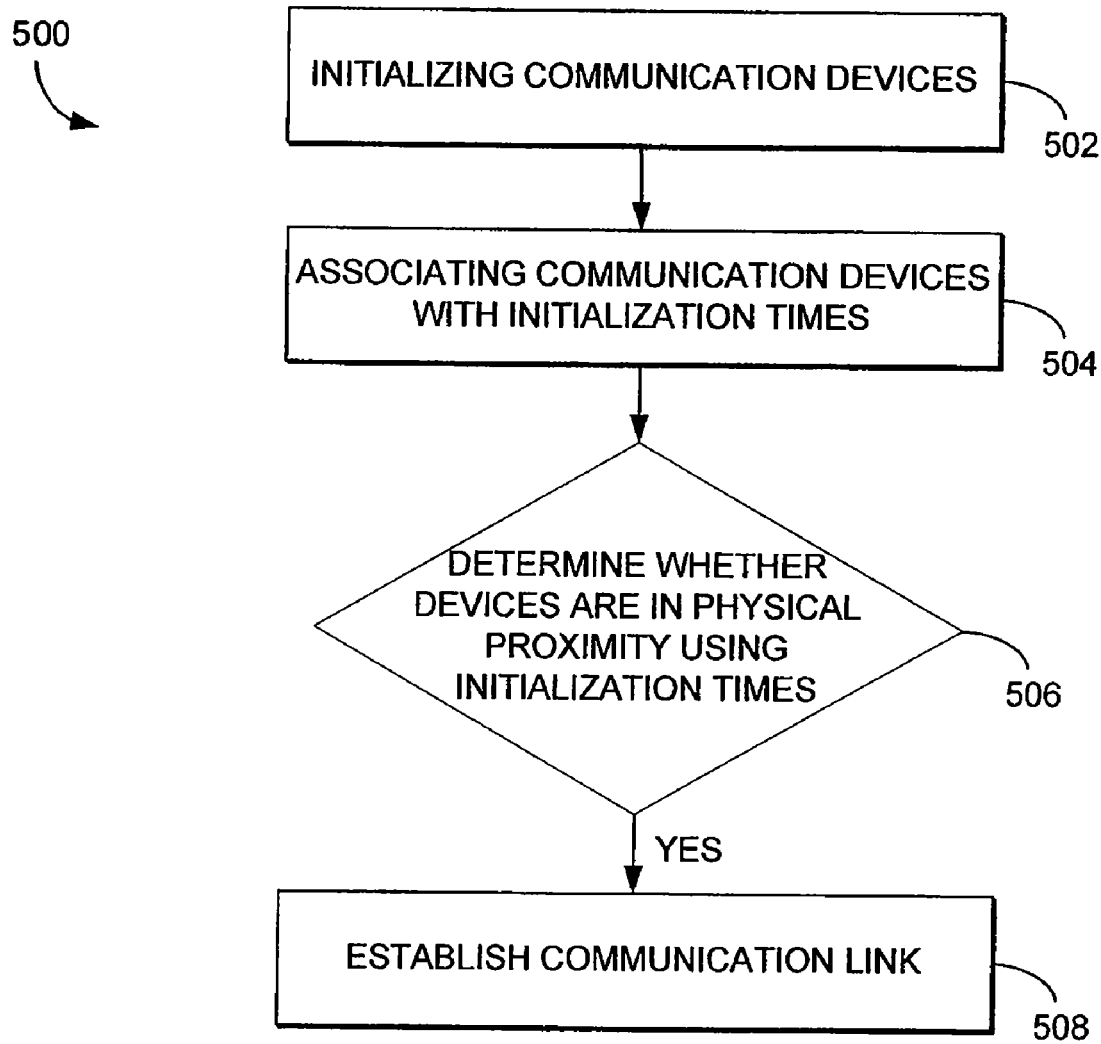
FIG. 5 is a flow diagram illustrating an exemplary method for wireless tractor-trailer communication utilizing initialization times for a physical proximity determination, in accordance with an embodiment of the present invention.

Turning now to FIG. 5, a flow diagram illustrating an exemplary method for wireless tractor-trailer communication utilizing initialization times for a physical proximity determination, in accordance with an embodiment of the present invention, is illustrated and designated generally as reference numeral 500. Initially, as indicated at block 502 communications devices are initialized. By way of example, without limitation, communication devices include wireless communication devices discussed previously with reference to FIGS. 1-3. Next, as indicated at block 504, the communication devices are associated with initialization times, e.g., by initialization comparing components 408 and 414 of FIG. 4. By way of example, as previously discussed, the limitation time may be a time counter starting at initialization.

Next, as indicated at block 506, it is determined, based upon initialization times, whether communication devices are in physical proximity. If it is determined that the communication devices are in physical proximity, a communication link is established, as indicated at block 508. It will be understood by one of ordinary skill in the art that this method may have various embodiments, including those embodiments discussed previously with reference to FIGS. 1-3.

Figure 6:
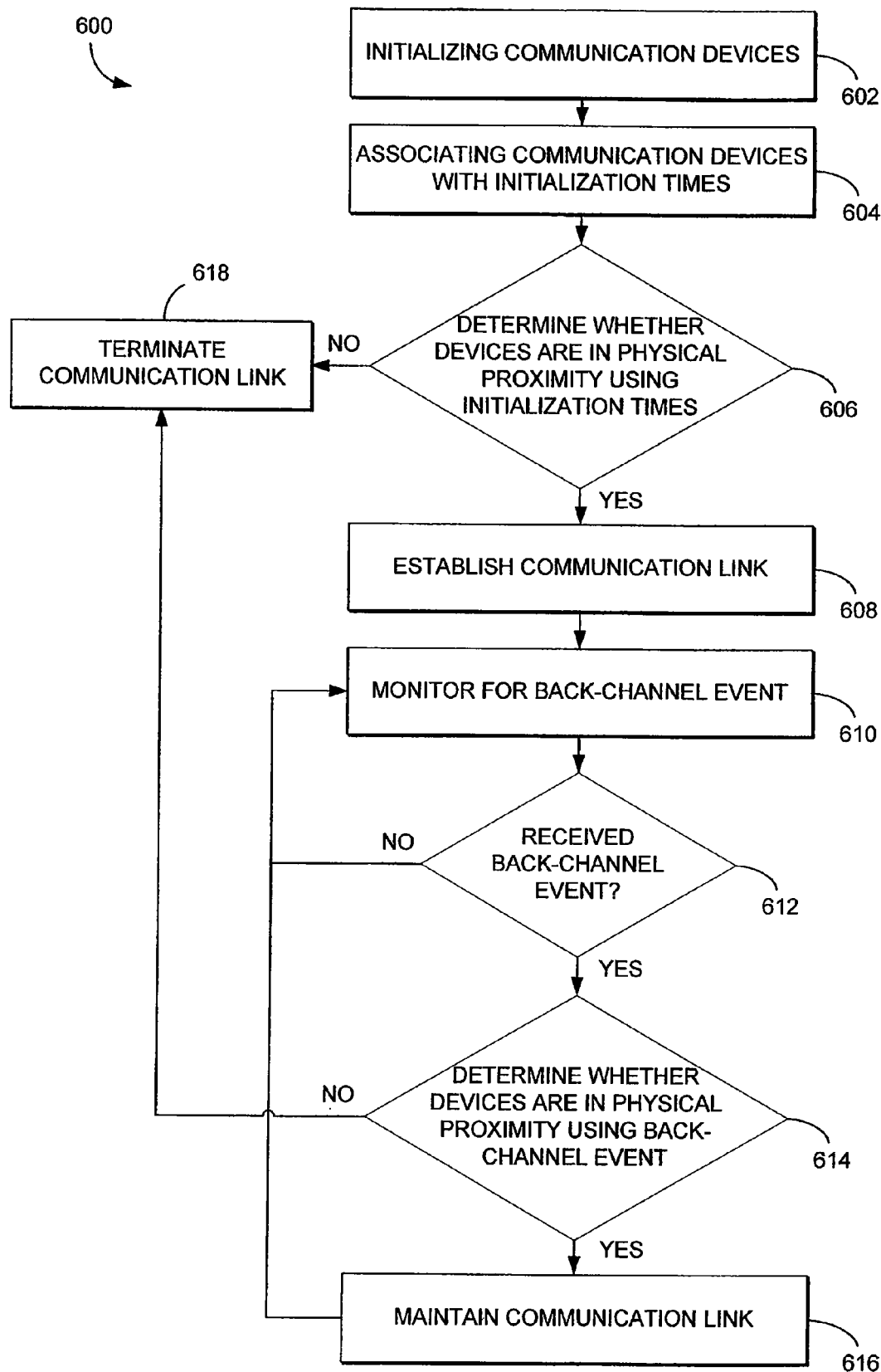
FIG. 6 is a flow diagram illustrating an exemplary method for wireless tractor-trailer communication utilizing initialization times and back-channel events for a physical proximity determination, in accordance with an embodiment of the present invention.

Turning now to FIG. 6, a flow diagram illustrating an exemplary method for wireless tractor-trailer communication utilizing initialization times and back-channel events for a physical proximity determination, in accordance with an embodiment of the present invention, is illustrated and designated generally as reference numeral 600. Initially at blocks 602 and 604 communication devices are initialized and associated with initialization times as discussed previously with reference to blocks 502 and 504 of FIG. 5. Next, as indicated at block 606, it is determined, based upon initialization times, whether communication devices are in physical proximity. If it is determined that the communication devices are in physical proximity, a communications line is established, as indicated at block 608, and back-channel events are monitored for as indicated at block 610. If it is determined that the communication devices are not in physical proximity, the communication link is terminated, as indicated at block 618.

Next, as indicated at block 612, it is determined whether a back-channel event has been received. If it is determined that a back-channel event has been received, it is next determined, based on the back-channel event, whether the communication devices are in physical proximity. If it is determined that the communication devices are in physical proximity, the communication link is maintained, as indicated at block 616. If it is determined that a back-channel event has not been received at block 612, back-channel events continue to be monitored, as indicated at block 610. Further, if it is determined that the communication devices are not in physical proximity at block 614, the communication link is terminated, as indicated at block 618.

Figure 7:
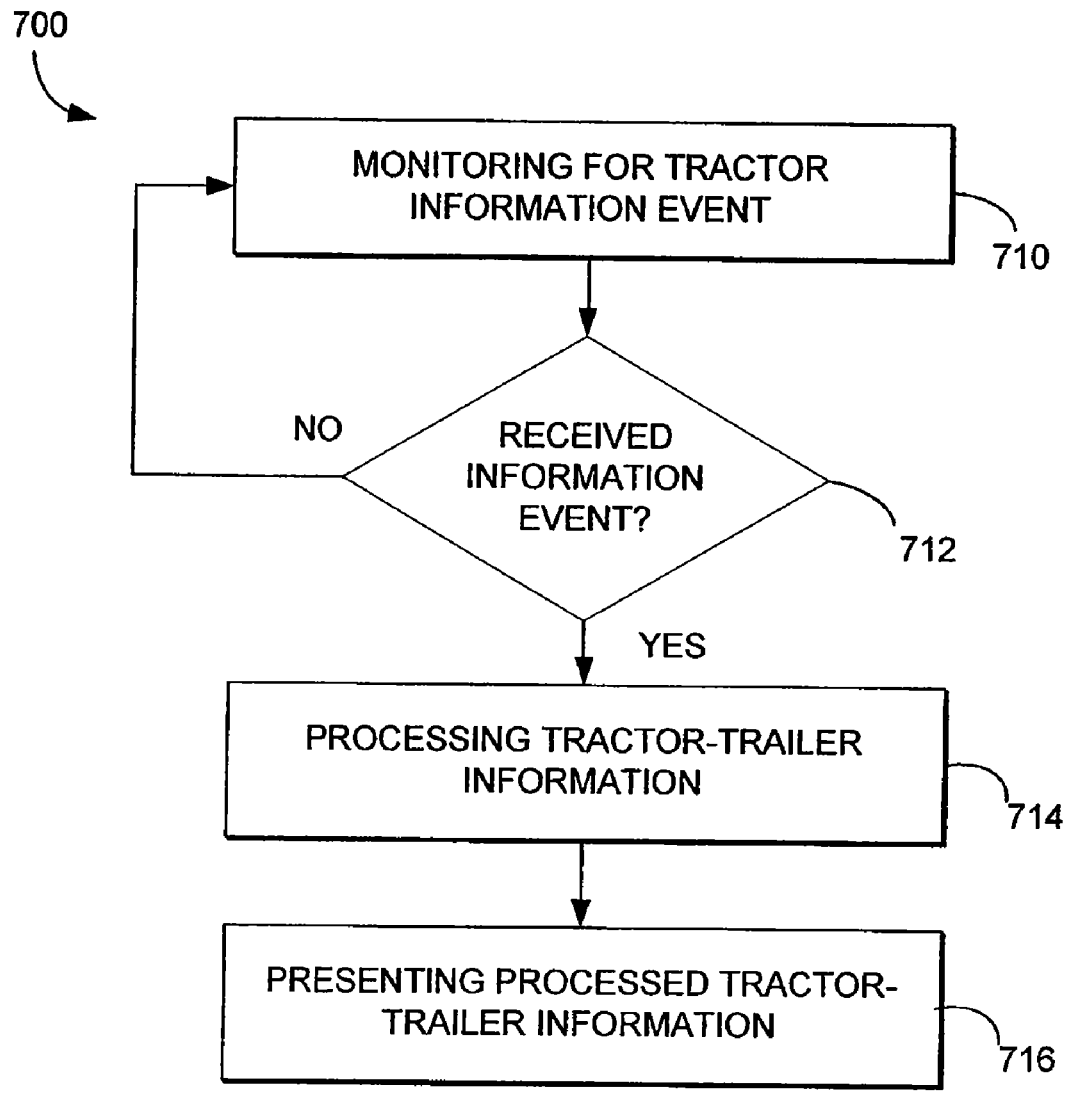
FIG. 7 is a flow diagram illustrating an exemplary method for wireless tractor-trailer communication, in accordance with an embodiment of the present invention.

Turning now to FIG. 7, a flow diagram illustrating an exemplary method for wireless tractor-trailer communication, in accordance with an embodiment of the present invention is illustrated and designated generally as reference numeral 700. Initially, as indicated at block 710, tractor information events are monitored for. As previously discussed with reference to FIGS. 1-3, a tractor information event may include transportation events (e.g. brake lights, signals, brake functionality, etc.), status events (e.g. temperature of refrigerated trailer, current contents of trailer, trailer weight, etc.), and historical events (e.g. wear on tires of trailer, miles on trailer, age, etc.).

Next, as indicated at block 712, it is determined whether an information event has been received. If it is determined that an information event has been received, the tractor-trailer information is processed, as indicated at block 714, and the processed tractor-trailer information is presented, as indicated at block 716. If it is determined that an information event has not been received, information events continue to be monitored, as indicated at block 710. One of ordinary skill in the art will appreciate that the present invention is not limited to any embodiment of wireless communication. Rather, various types of information may be communicated, wirelessly, between a tractor and one or more trailers. Further, as discussed previously with reference to FIGS. 1-3, the presentation of the information may occur in the tractor or at a remote location, and the information presentation may be via various computing devices. The various computing devices, and various locations of information presentation are contemplated and within the scope of the present invention.

Figure 8:
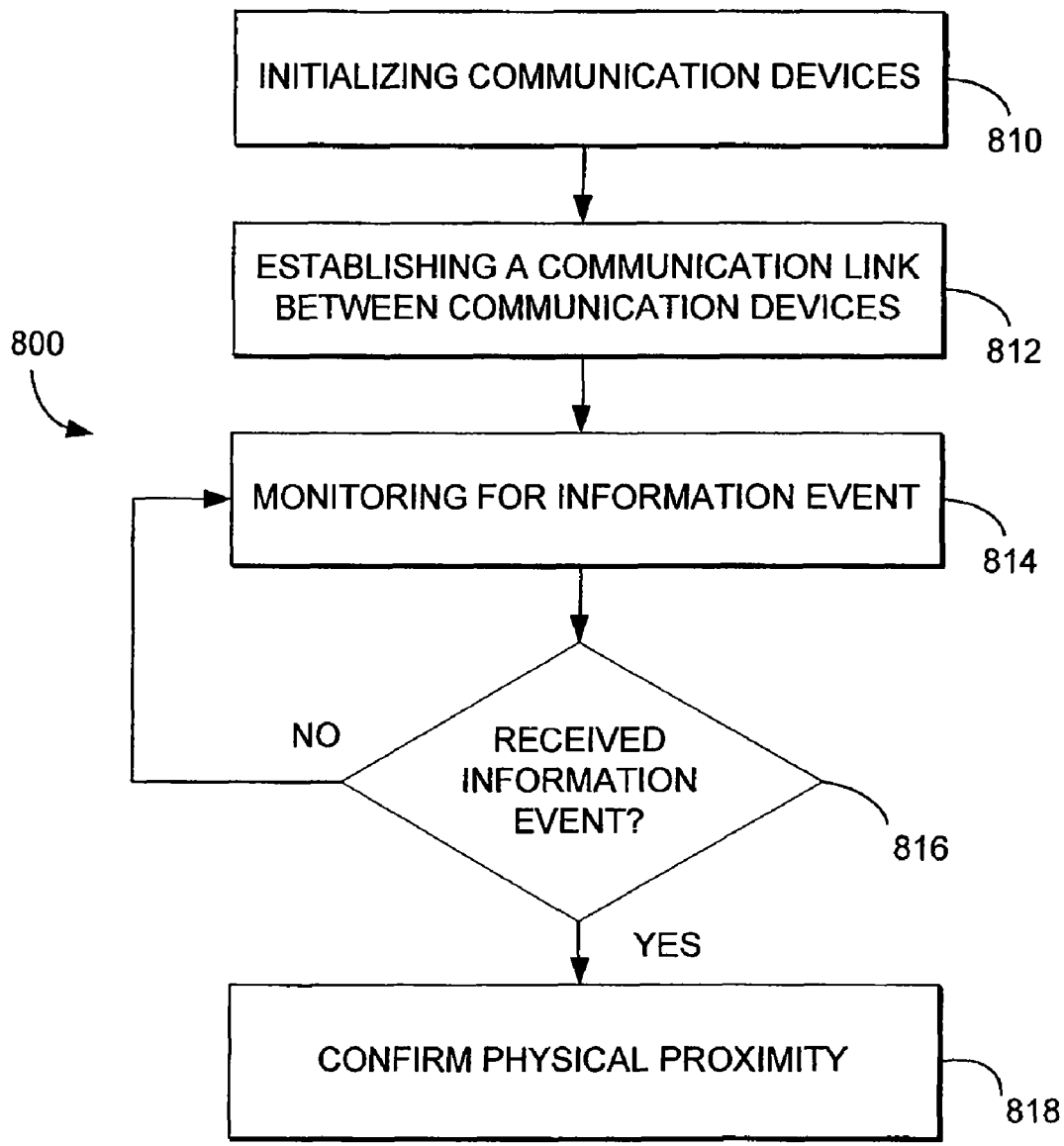
FIG. 8 is a flow diagram illustrating an exemplary method for wireless communication, in accordance with an embodiment of the present invention.

As will be understood and appreciated by those of ordinary skill in the art, embodiments of the present invention may be directed to wireless communications outside a tractor-trailer environment. For example, turning now to FIG. 8, a flow diagram of an exemplary method for wireless communication, in accordance with an embodiment of the present invention is illustrated and designated generally as reference numeral 800. Initially, as indicated at block 810, communications devices are initialized. For example, in various embodiments, without limitation, initialization may include providing power to the communications devices. One of ordinary skill in the art will understand and appreciate that the communications devices may include various types of wireless communication device capable of observing information events.

Next, as indicated at block 812, a communication link is established between the communication devices. For example, without limitation, where a first communication device recognizes a signal from a second communication device, the communication link will be established. An information event will be monitored for, as indicated at block 814, and it is determined whether an information event has been received, as indicated at block 816. In various embodiments, without limitation, an information event may include various types of events. For instance, as previously stated, the information event may include events that will be recognized by both a tractor and a trailer, such as a brake light signal. Information events, however, are not limited to tractor-trailer events. For example, without limitation, an information event may include an electronic signal, such as when two computers are communicating wirelessly and remain in proximity. Or, an information event may include environmental observations such as an audio signal or an optical signal observed by both a first and a second wireless communication device in order to confirm the communication devices are in physical proximity. Thus, if it is determined that an information event has been received, the physical proximity of the wireless communication devices will be confirmed, as indicated in block 818. If, on the other hand, it is determined that an information event has not been received, information events will continue to be monitored for, as indicated at block 814.

In each of the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods, computer-readable media, and graphical user interfaces. It will be understood that certain features and sub-combinations are of utility and may be employed without reference to other features and sub-combinations. This is contemplated by and within the scope of the claims.

What is claimed is:

1. A method in a tractor-trailer environment for wirelessly communicating between a tractor and a set of trailers, the method comprising:
    initializing a tractor wireless communication device associated with the tractor;
    initializing at least one trailer wireless communication device associated with at least one of the set of trailers;
    associating the tractor wireless communication device with a tractor initialization time, wherein the tractor initialization time indicates a time at which the tractor wireless communication device was initialized;
    associating each of the at least one trailer wireless communication device with a trailer initialization time, wherein the trailer initialization time indicates a time at which each of the at least one trailer wireless communication device was initialized;
    establishing a communication link between the tractor wireless communication device and the at least one trailer wireless communication device and exchanging event information between said devices; and
    determining whether the tractor wireless communication device and the at least one trailer wireless communication device are in physical proximity by comparing the tractor initialization time with the trailer initialization time.

2. The method of claim 1, wherein an initialization of the tractor communication device and the trailer communication device comprises providing power to the communication devices.

3. The method of claim 1, further comprising:
    monitoring the tractor-trailer environment for a back-channel event; and
    upon receiving the back-channel event, determining whether the tractor wireless communication device and the at least one trailer wireless communication device remain in physical proximity.

4. The method of claim 3, wherein, if it is determined that the tractor wireless communication device and the at least one trailer wireless communication device remain in physical proximity, the method further comprises maintaining the communication link between the tractor wireless communication device and the at least one trailer wireless communication device.

5. The method of claim 3, wherein, if it is determined that the tractor wireless communication device and the at least one trailer wireless communication device are not in physical proximity, the method further comprises terminating the communication link between the tractor wireless communication device and the at least one trailer wireless communication device.

6. The method of claim 3, wherein the tractor initialization time and the trailer initialization time are counters that begin incrementing upon initializing the tractor wireless communication device and the at least one trailer wireless communication device.

7. The method of claim 6, wherein the back-channel event is a brake signal.

8. The method of claim 6, wherein the back-channel event includes information associated with at least one of a blinker, a noise, and an optical observation.

9. A tractor-trailer communications system for providing wireless communication between a tractor and a set of trailers, the system comprising:
    a tractor wireless communication device associated with the tractor, the tractor wireless communication device associated with a tractor initialization time, wherein the tractor initialization time indicates a time at which the tractor wireless communication device was initialized;
    at least one trailer wireless communication device associated with at least one of the set of trailers, each of the at least one trailer wireless communication device associated with a trailer initialization time, wherein the trailer initialization time indicates a time at which each of the at least one trailer wireless communication device was initialized;
    an initialization comparing component configured to determine if the tractor wireless communication device and the at least one trailer wireless communication device are in physical proximity using an initialization information and an information event, wherein using the initialization information comprises comparing the tractor initialization time with the trailer initialization time; and
    a database configured to store information associated with the tractor wireless communication device and the at least one trailer wireless communication device.

10. The system of claim 9, further comprising:
    a monitoring component configured to monitor a tractor-trailer environment for a back-channel event; and
    a back-channel comparing component configured to determine if the tractor wireless communication device and the at least one trailer communication device are in physical proximity using a back-channel event information.

11. The system of claim 10, further comprising a presentation component configured to present the information associated with the tractor wireless communication device and the at least one trailer wireless communication device.

12. The system of claim 11, wherein the information associated with the tractor wireless communication device and the at least one trailer wireless communication device includes at least one of a back-channel event, a transportation event, a status event, and a trailer historical information event.

13. One or more non-transitory computer readable media having instructions embodied thereon that, when executed, perform a method for wirelessly communicating between a tractor and a set of trailers, the method comprising:
    establishing a communication link between the tractor and the set of trailers, wherein the communication link is established based on determining that a tractor wireless communication device and a trailer wireless communication device of each trailer in the set of trailers are in physical proximity by comparing a tractor initialization time for the tractor with a trailer initialization time corresponding to each trailer in the set of trailers, wherein the tractor initialization time indicates a time at which the tractor wireless communication device was powered and the trailer initialization time corresponding to each trailer in the set of trailers indicates a time at which each trailer wireless communication device of each trailer in the set of trailers was powered;
    monitoring a tractor-trailer environment for one or more trailer information events; and
    upon receiving the one or more tractor-trailer information events, processing tractor-trailer information in accordance with the one or more tractor-trailer information events.

14. The media of claim 13, further comprising presenting the processed tractor-trailer information.

15. The media of claim 14, wherein the one or more tractor-trailer information events include one or more back-channel events.

16. The media of claim 14, wherein the one or more tractor-trailer information events include one or more transportation events.

17. The media of claim 16, wherein the one or more transportation events include information associated with at least one of a brake light, a blinker, a brake functionality measurement, and a hitch connectivity measurement.

18. The media of claim 14, wherein the one or more tractor-trailer information events include one or more status events.

19. The media of claim 18, wherein the one or more status events include information associated with at least one of a trailer temperature, a trailer content, and a trailer weight.

20. The media of claim 14, wherein the one or more tractor-trailer information events include one or more trailer historical events.

21. The media of claim 20, wherein the one or more trailer historical events include information associated with at least one of a tire wear measurement, a trailer mile measurement, and a trailer age measurement.

22. A method for wirelessly communicating, the method comprising:
    initializing a first wireless communication device, wherein the first wireless communication device is associated with a first initialization time, the first initialization time indicating a time at which the first wireless communication device was initialized;
    initializing a second wireless communication device, wherein the second wireless communication device is associated with a second initialization time, the second initialization time indicating a time at which the second wireless communication device was initialized;
    establishing a communication link between the first wireless communication device and the second wireless communication device, the communication link comprising a communications environment;
    determining whether the first wireless communication device and the second wireless communication device are in physical proximity by comparing the first initialization time with the second initialization time;
    monitoring the communications environment for an information event; and
    upon receiving the information event, confirming that the first wireless communication device and the second wireless communication device are in physical proximity based upon the information event.

23. The method of claim 22, wherein, if it is determined that the first wireless communication device and the second wireless communication device are in physical proximity, the method further comprises maintaining a communication link between the first wireless communication device and the second wireless communication device.

24. The method of claim 22, wherein, if it is determined that the first wireless communication device and the second wireless communication device are not in physical proximity, the method further comprises terminating the communication link between the tractor wireless communication device and the at least one trailer wireless communication device.

25. The method of claim 22, wherein the information event includes an electronic signal received by the first wireless communication device and the second wireless communication device.

26. The method of claim 22, wherein the information event includes an audio signal received by the first wireless communication device and the second wireless communication device.

27. The method of claim 22, wherein the information event includes an optical signal received by the first wireless communication device and the second wireless communication device.

* * * * *